United States Patent
Hsueh (10) Patent No.: US 10,034,341 B1
(45) Date of Patent: Jul. 24, 2018

(54) ADAPTIVE BACKLIGHT DEVICE, SYSTEM AND CONTROL METHOD THEREOF

(71) Applicant: ANPEC ELECTRONICS CORPORATION, Hsinchu (TW)

(72) Inventor: Wei-Chieh Hsueh, Hsinchu (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 0 days.

(21) Appl. No.: 15/875,040

(22) Filed: Jan. 19, 2018

(30) Foreign Application Priority Data

Oct. 11, 2017 (TW) .............................. 106134754 A (51) Int. Cl.
  *H05B 33/08* (2006.01)
(52) U.S. Cl.
  CPC ..... *H05B 33/0842* (2013.01); *H05B 33/0809* (2013.01)
(58) Field of Classification Search
  CPC ............ H05B 33/0842; H05B 33/0815; H05B 37/02; H05B 37/029; H05B 33/0827; H05B 33/083; H05B 33/0803; H05B 33/0809; H05B 33/0845; Y02B 20/341; Y02B 20/345; G09G 2310/0237; G09G 2320/0646; H05K 19/0013; H05K 19/0016
  See application file for complete search history.

(56) References Cited

U.S. PATENT DOCUMENTS

| 7,382,178 B2 * | 6/2008 | Caplan ............... H03K 19/0013 327/536 |
| 8,395,325 B2 * | 3/2013 | Ye ..................... H05B 33/0827 315/122 |
| 2017/0263193 A1 * | 9/2017 | Han ..................... G09G 3/3406 |

* cited by examiner

*Primary Examiner* — Haissa Philogene
(74) *Attorney, Agent, or Firm* — Li & Cai Intellectual Property (USA) Office (57) ABSTRACT

An adaptive backlight device includes a transistor, a voltage detector and an adaptive controller. The transistor is configured to control the current flowing through a light string. The transistor provides a first voltage signal and a second voltage signal. The voltage detector generates a voltage difference signal according to the first voltage signal and the second voltage signal. The adaptive controller receives the voltage difference signal from the voltage detector. The adaptive controller includes a counter. When the adaptive controller determines that the voltage difference signal is larger than or equal to a predetermined value, the adaptive controller increases the current flowing through the light string at least once via the control end of the transistor to increase the cross voltage of the light string and decrease the cross voltage of the transistor.

16 Claims, 5 Drawing Sheets

ADAPTIVE BACKLIGHT DEVICE, SYSTEM AND CONTROL METHOD THEREOF

BACKGROUND OF THE INVENTION

1. Field of the Invention

The present disclosure relates to a backlight device, a backlight system and a control method thereof; in particular, to an adaptive backlight device, an adaptive backlight system and a control method thereof.

2. Description of Related Art

Figure 1:
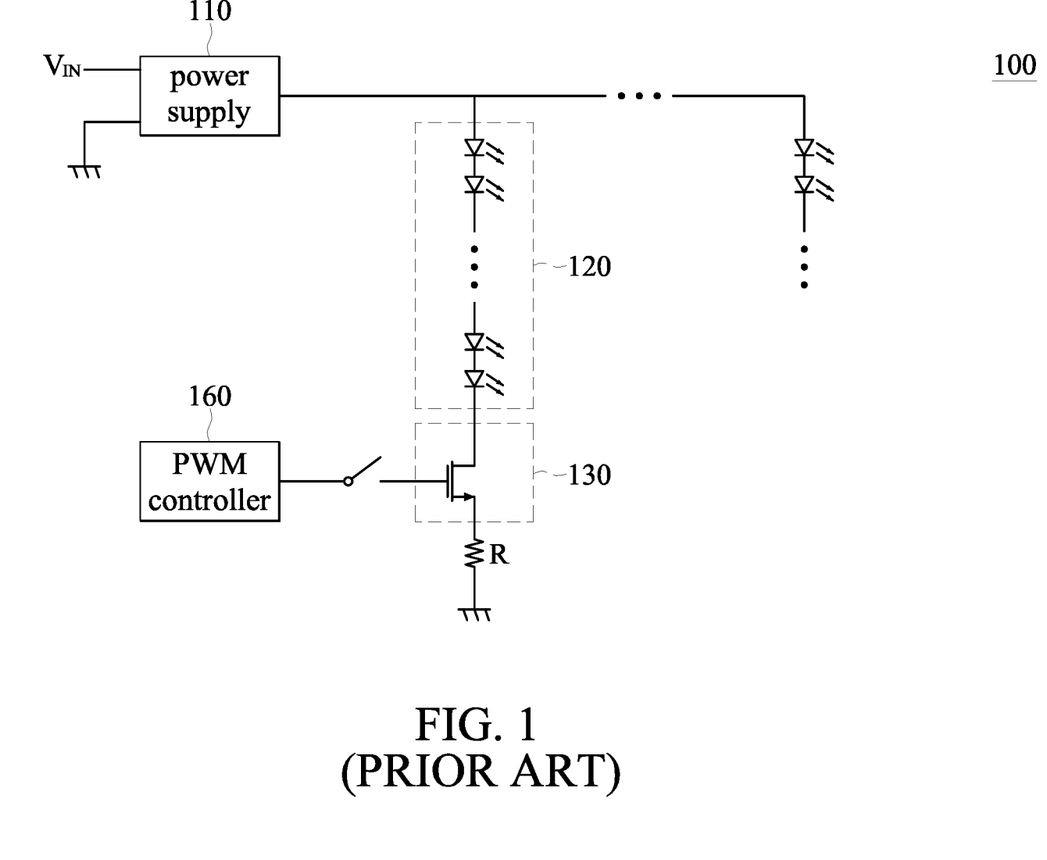
FIG. 1 shows a block diagram of a conventional backlight device.

Referring to FIG. 1, a block diagram of a conventional backlight device is shown. The backlight device 100 includes a power supply 110, a light string 120, a transistor 130, a pulse width modulator 160 and a resistor R. The transistor 130, the pulse width modulator 160 and the resistor R are configured on a chip. Due to the manufacturing variations, the LEDs of the light string may slightly vary in size or other parameters. When the cross voltage of the light string 120 is too low, the cross voltage of the transistor 130 would be too high. As a result, the transistor 130 may burn out and other electronic elements on the chip may also be damaged.

SUMMARY OF THE INVENTION

The present disclosure provides an adaptive backlight device, an adaptive backlight system and a control method thereof. In the present disclosure, the cross voltage of a transistor can be detected by a voltage detector, and an adaptive controller accordingly controls the current flowing through a light string and the transistor to adjust the cross voltage of the transistor.

The adaptive backlight device provided by the present disclosure is used for controlling at least one light string. A power supply is connected to one end of the light string, and a voltage from the power supply is provided to the light string. The light string has a plurality of LEDs, and the light string has a cross voltage. The adaptive backlight device includes a transistor, a voltage detector and an adaptive controller. The transistor has a first end, a second and a control end. The first end of the transistor is connected to the other end of the light string. The transistor controls a current flowing through the light string. A cross voltage of the transistor is obtained according to a voltage difference between the voltage at the first end of the transistor and the voltage at the second end of the transistor. The voltage detector has a first input end and a second input end. The first input end of the voltage detector is coupled to the first end of the transistor and receives a first voltage signal, and the second input end of the voltage detector is coupled to the second end of the transistor and receives a second voltage signal. The voltage detector generates a voltage difference signal according to the first voltage signal and the second voltage signal. The adaptive controller is connected to the voltage detector and the control end of the transistor, and includes a counter. The adaptive controller receives the voltage difference signal from the voltage detector. When the adaptive controller determines that the voltage difference signal is larger than or equal to a predetermined value, the adaptive controller increases the current flowing through the light string at least once. When the voltage difference signal has been larger than or equal to the predetermined value over a predetermined time duration, the counter adds 1 to its count value such that the adaptive controller increases the current flowing through the light string step by step. When the adaptive controller determines that the voltage difference signal is smaller than the predetermined value and/or that the voltage difference signal exceeds the predetermined time duration, the counter sets its count value to zero.

The control method of a backlight device provided by the present disclosure is adapted to an adaptive backlight system. The adaptive backlight system includes a power supply, at least one light string, a transistor, a voltage detector and an adaptive controller. The transistor has a first end, a second end and a control end. The voltage detector has a first input end and a second input end, and the adaptive controller has a counter. The control method includes: controlling the current flowing through the light string through the transistor; obtaining a cross voltage of the transistor according to a voltage difference between the voltage at the first end of the transistor and the voltage at the second end of the transistor; receiving a first voltage signal from the first input end of the voltage detector and receiving a second voltage signal from the second input end of the voltage detector; generating a voltage difference signal by the voltage detector according to the first voltage signal and the second voltage signal; and receiving the voltage difference signal by the adaptive controller from the voltage detector. When the adaptive controller determines that the voltage difference signal is larger than or equal to a predetermined value, the adaptive controller increases the current flowing through the light string at least once to increase the cross voltage of the light string and decrease the cross voltage of the transistor. When the voltage difference signal has been larger than or equal to the predetermined value over a predetermined time duration, the counter adds 1 to its count value such that the adaptive controller increases the current flowing through the light string step by step. When the adaptive controller determines that the voltage difference signal is smaller than the predetermined value and/or that the voltage difference signal exceeds the predetermined time duration, the counter sets its count value to zero.

The adaptive backlight system provided by the present disclosure includes a power supply, at least one light string and an adaptive backlight device. The power supply is connected to one end of the light string, and a voltage from the power supply is provided to the light string. The light string has a plurality of LEDs, and the light string has a cross voltage. The adaptive backlight device includes a transistor, a voltage detector and an adaptive controller. The transistor has a first end, a second and a control end, and the first end of the transistor is connected to the other end of the light string. The transistor controls a current flowing through the light string. A cross voltage of the transistor is obtained according to a voltage difference between the voltage at the first end of the transistor and the voltage at the second end of the transistor. The voltage detector has a first input end and a second input end. The first input end of the voltage detector is coupled to the first end of the transistor and receives a first voltage signal, and the second input end of the voltage detector is coupled to the second end of the transistor and receives a second voltage signal. The voltage detector generates a voltage difference signal according to the first voltage signal and the second voltage signal. The adaptive controller is connected to the voltage detector and the control end of the transistor, and includes a counter. The adaptive controller receives the voltage difference signal from the voltage detector. When the adaptive controller determines that the voltage difference signal is larger than or equal to a predetermined value, the adaptive controller increases the current flowing through the light string at least once. When the voltage difference signal has been larger than or equal to the predetermined value over a predetermined time duration, the counter adds 1 to its count value, such that the adaptive controller increases the current flowing through the light string step by step. When the adaptive controller determines that the voltage difference signal is smaller than the predetermined value and/or that the voltage difference signal exceeds the predetermined time duration, the counter sets its count value to zero.

For further understanding of the present disclosure, reference is made to the following detailed description illustrating the embodiments of the present disclosure. The description is only for illustrating the present disclosure, not for limiting the scope of the claim.

BRIEF DESCRIPTION OF THE DRAWINGS

Embodiments are illustrated by way of example and not by way of limitation in the figures of the accompanying drawings, in which like references indicate similar elements and in which.

DETAILED DESCRIPTION OF EXEMPLARY EMBODIMENTS

The aforementioned illustrations and following detailed descriptions are exemplary for the purpose of further explaining the scope of the present disclosure. Other objectives and advantages related to the present disclosure will be illustrated in the subsequent descriptions and appended drawings. In these drawings, like references indicate similar elements.

Figure 2:
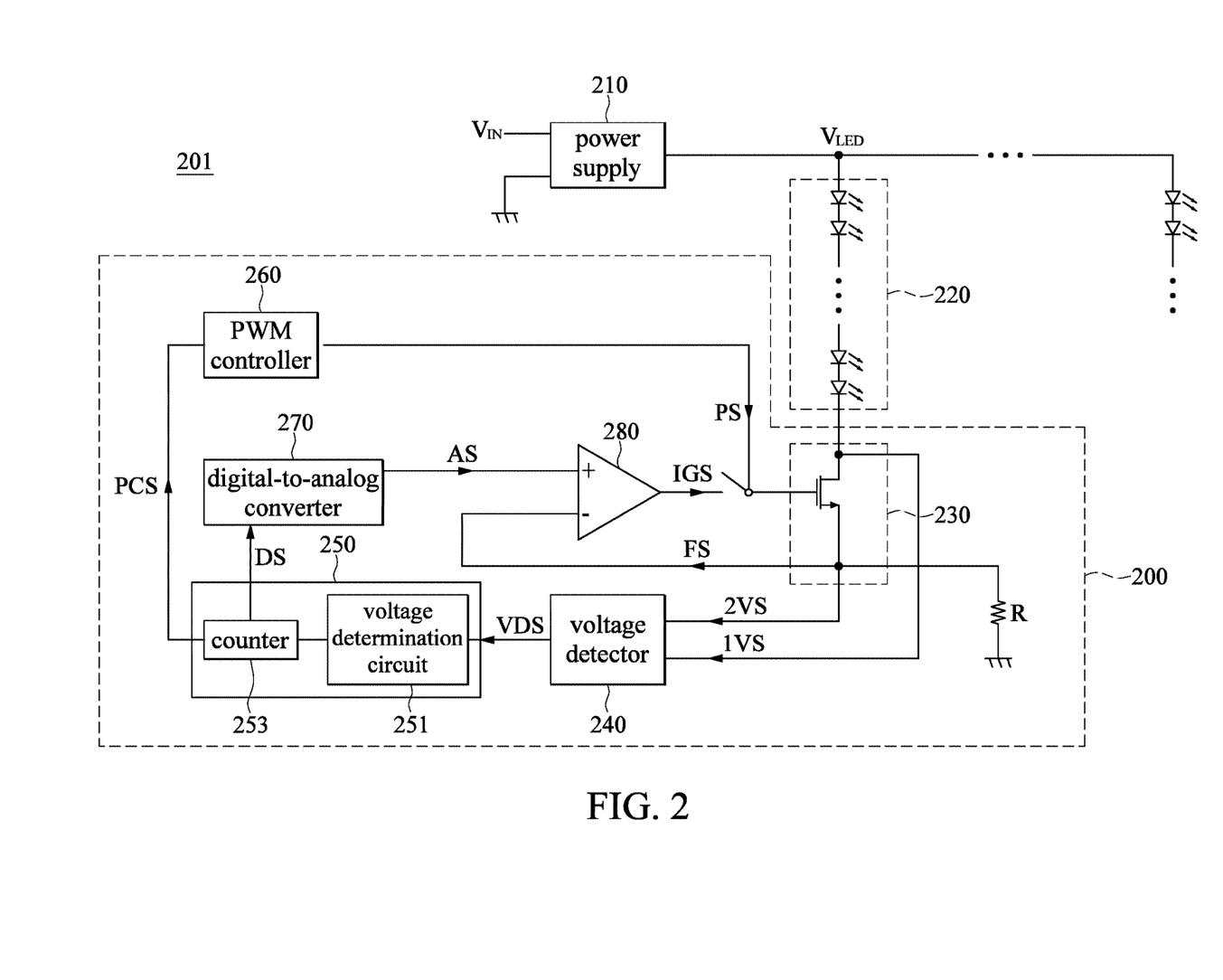
FIG. 2 shows a block diagram of an adaptive backlight system according to one embodiment of the present disclosure.

Referring to FIG. 2, a block diagram of an adaptive backlight system according to one embodiment of the present disclosure is shown. The adaptive backlight system 201 includes a power supply 210, a plurality of light strings 220 and an adaptive backlight device 200. The power supply 210 receives an input voltage VIN. The adaptive backlight device 200 includes a transistor 230, a voltage detector 240, an adaptive controller 250, a PWM controller 260, a digital-to-analog converter 270, an operational amplifier 280 and a resistor R.

The power supply 210 is connected to one end of each light string 220. The power supply 210 receives the input voltage VIN, and then boosts and/or bucks the input voltage VIN. The power supply 210 is configured to provide a voltage VLED to each light string 220. In this embodiment, the backlight device 200 has more than one light string 220; however, in FIG. 2, for ease of illustration, only one light string 220 and its periphery circuits are shown. The brightness of the light string 220 is controlled according to the voltage VLED. Each light string 220 has a plurality of LEDs, and each light string 220 has a cross voltage for emitting light. As understood by those skilled in the art, each LED has its turn-on voltage (roughly 0.65V~0.7V), and when the cross voltage of one LED (the voltage difference between two ends of the LED) is larger than its turn-on voltage, the LED emits light. Thus, for each light string 220, the cross voltage for emitting light is the sum of the turn-on voltages of the LEDs of one light string 220.

The transistor 230 has a first end, a second end and a control end. The first end of the transistor 230 is connected to another end of the light string 220. The current flowing through the light string 220 is controlled by the control end of the transistor 230. The cross voltage of the transistor 230 can be obtained according to the voltage difference of the voltage at the first end of the transistor 230 and the voltage at the second end of the transistor 230. In this embodiment, the transistor 230 can be a MOSFET (Metal-Oxide-Semiconductor Field-Effect Transistor) or a BJT (Bipolar Junction Transistor). When the transistor 230 is a MOSFET, the first end of the transistor 230 is a collector, the second end of the transistor 230 is an emitter and the control end of the transistor 230 is a base.

The voltage detector 240 has a first input end and a second input end. The first input end of the voltage detector 240 is connected to the first end of the transistor 230 and receives a first voltage signal 1VS. The second input end of the voltage detector 240 is connected to the second end of the transistor 230 and receives a second voltage signal 2VS. The voltage detector 240 generates a voltage difference signal VDS according to the first voltage signal 1VS and the second voltage signal 2VS.

The adaptive controller 250 is connected to the voltage detector 240 and the control end of the transistor 230, and receives the voltage difference signal VDS from the voltage detector 240. In this embodiment, the adaptive controller 250 can further include a voltage determination circuit 251 and a counter 253. The voltage determination circuit 251 is connected to the counter 253. The voltage determination circuit 251 is configured to receive the voltage difference signal VDS and calculates the cross voltage of the transistor 230. The cross voltage of the transistor 230 affects the temperature of the transistor 230. The digital-to-analog converter 270 is connected to the counter 253 of the adaptive controller 250. The digital-to-analog converter 270 receives a digital current signal DS from the counter 253, and then converts the digital current signal DS to an analog current signal AS. For example, the digital current signal DS is a 3 bit signal, which is represented by digital codes 0~7. The current outputted by the transistor 230 is controlled within a range from 100 mA×(1+0%) to 100 mA×(1+7%) according to the analog current signal AS. When the voltage determination circuit 251 of the adaptive controller 250 determines that the voltage difference signal VDS is larger than or equal to a predetermined value (e.g. 1.5V), the temperature of the transistor 230 may be too high.

The operational amplifier 280 has an inverting end, a non-inverting input end and an output end. The non-inverting input end of the operational amplifier 280 is connected to the digital-to-analog converter and receives the analog current signal AS. The inverting end of the operational amplifier 280 is connected to the second end of the transistor 230 and receives a feedback signal FS from the second end of the transistor 230. The output end of the transistor 230 is connected to the control end of the transistor 230. The operational amplifier 280 generates a current control signal IGS according to the analog current signal AS and the feedback signal FS. The current control signal IGS controls the current flowing through the transistor 230 via the control end of the transistor 230. When the transistor 230 is a MOSFET, the current flowing through the transistor 230 can be increased by increasing the voltage at the gate of the transistor 230. When the transistor 230 is a BJT, the current flowing through the transistor 230 can be increased by increasing the voltage at the base of the transistor 230. One end of the resistor R is connected to the second end of the transistor 230 and the inverting input end of the operational amplifier 280, and the other end of the resistor R is grounded. It should be noted that, the transistor 230, the voltage detector 240, the adaptive controller 250, the PWM controller 260, the digital-to-analog converter 270, the operational amplifier 280 and the resistor R are configured on a chip.

The adaptive controller 250 increases the current flowing through the light string 220 at least once via the control end of the transistor 230, to increase the cross voltage of the light string 220 and decrease the cross voltage of the transistor 230. For example, when the cross voltage of the transistor 230 is 1.8V, the current outputted by the transistor 230 can be increased step by step according to the analog current signal AS (e.g. from 100 mA×(1+0%) to 100 mA×(1+1%) then to 100 mA×(1+2%) then to 100 mA×(1+3%)). During this adjustment, the total resistance of the LEDs of the light string 220 does not change. Thus, if the current flowing through the light string 220 is increased, the cross voltage of the light string 220 will be increased and the temperature of the transistor 230 can drop because the cross voltage of the transistor 230 will be decreased.

In addition, the counter 253 of the adaptive controller 250 adds 1 to its count value when the voltage difference signal VDS has been larger than or equal to the predetermined value over a predetermined time duration. As a result, the adaptive controller 250 increases the current flowing through the light string 220 step by step via the control end of the transistor 230. On the other hand, the counter 253 of the adaptive controller 250 sets its count value to be zero when the voltage difference signal VDS is smaller than the predetermined value and/or when the voltage difference signal VDS exceeds the predetermined time duration. As a result, the adaptive controller 250 maintains the current flowing through the light string 220 via the control end of the transistor 230.

The PWM controller 260 is connected to the counter 253 of the adaptive controller 250 and the control end of the transistor 230. When the voltage difference signal VDS has been larger than or equal to the predetermined value over the predetermined time duration, the counter 253 of the adaptive controller 250 generates a control signal PCS. The PWM controller 260 receives the control signal PCS, and then transmits a PWM signal PS to the control end of the transistor 230 according to the control signal PCS. It is worth mentioning that, a product obtained by multiplying the current flowing through the light string 220 and the PWM signal PS is constant, and is used to make the brightness of the light strings 220 match with each other. For example, when the current outputted by the transistor 230 is 100 mA×(1+5%), the PWM signal PS will be divided by (1+5%).

Figure 3:
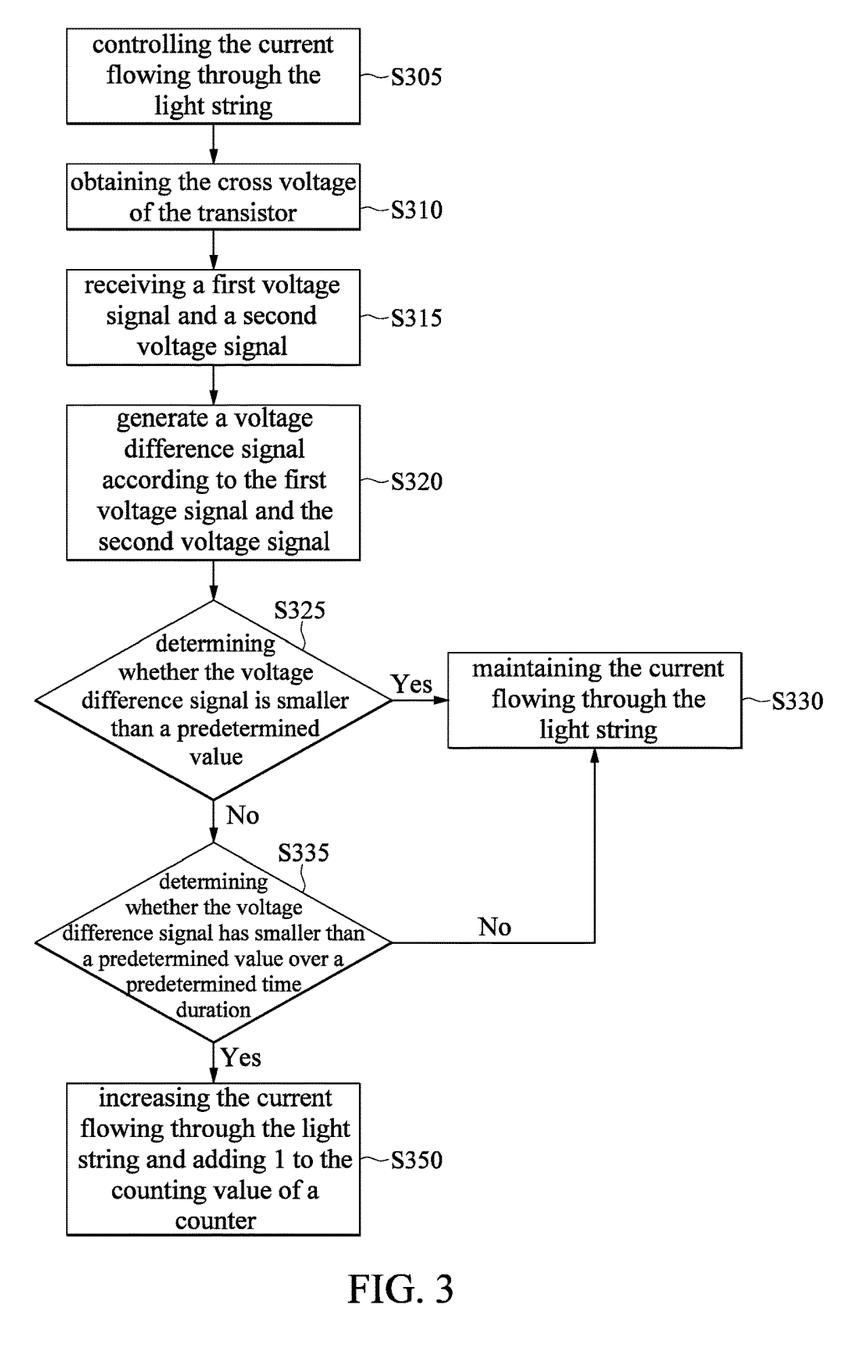
FIG. 3 shows a flow chart of a control method of an adaptive backlight device according to one embodiment of the present disclosure.

Reference is made to FIG. 2 and FIG. 3. FIG. 2 shows a block diagram of an adaptive backlight system according to one embodiment of the present disclosure, and FIG. 3 shows a flow chart of a control method of an adaptive backlight device according to one embodiment of the present disclosure. In step S305, the current flowing through the light string 220 is controlled by the transistor 230. In step S310, the cross voltage of the transistor 230 is obtained according to the voltage difference between the voltage at the first end of the transistor 230 and the voltage at the second end of the transistor 230. In step S315, a first voltage signal 1VS is transmitted to the first input end of the voltage detector 240, and a second voltage signal 2VS is transmitted to the second input end of the voltage detector 240. In step S320, the voltage detector 240 generates a voltage difference signal VDS according to the first voltage signal 1VS and the second voltage signal 2VS. In addition, the voltage determination circuit 251 of the adaptive controller 250 receives the voltage difference signal VDS and then calculates the cross voltage of the transistor 230. In step S325, the adaptive controller 250 determines whether the voltage difference signal VDS is smaller than a predetermined value. When the voltage difference signal VDS is smaller than a predetermined value, the method advances to step S330. When the voltage difference signal VDS is not smaller than a predetermined value, the method advances to step S335. In step S330, the adaptive controller 250 maintains the current flowing through the light string 220, and the count value of the counter 253 is zero. In step S335, the adaptive controller 250 determines whether the voltage difference signal VDS has been larger than or equal to the predetermined value over a predetermined time duration. If the voltage difference signal VDS has been larger than or equal to the predetermined value over the predetermined time duration, the method advances to step S350. If the voltage difference signal VDS has not been larger than or equal to the predetermined value over the predetermined time duration, the method returns to step S330. In step S350, the adaptive controller 250 increases the current flowing through the light string 220, and the counter 253 adds 1 to its count value.

Figure 4:
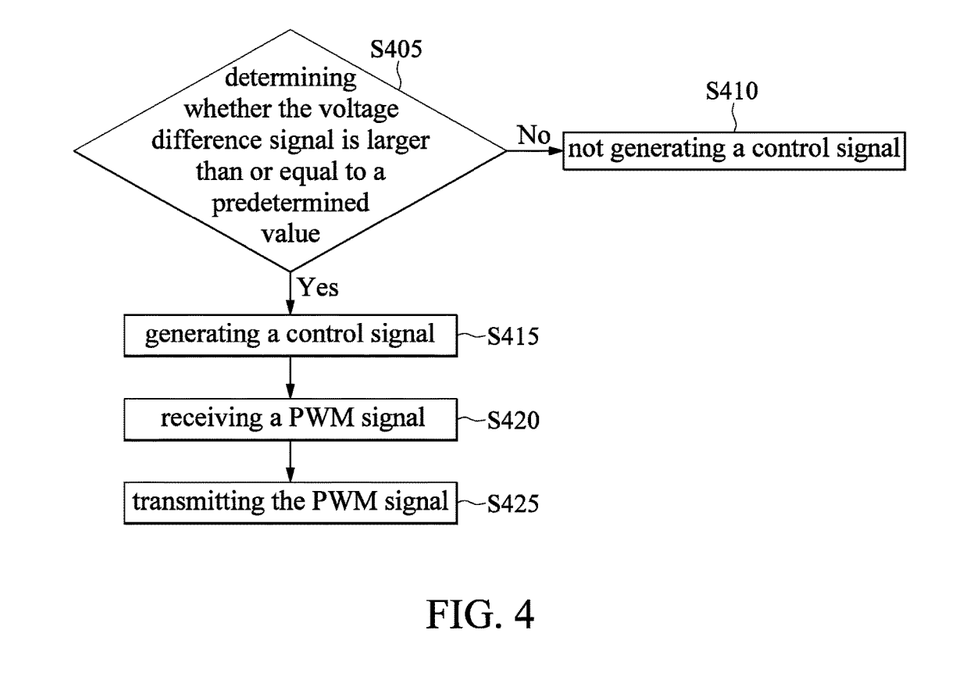
FIG. 4 shows a flow chart of a control method of an adaptive backlight device according to another embodiment of the present disclosure.

Reference is made to FIG. 2 and FIG. 4. FIG. 4 shows a flow chart of a control method of an adaptive backlight device according to another embodiment of the present disclosure. In step S405, the adaptive controller 250 determines whether the voltage difference signal VDS is larger than a predetermined value. If the voltage difference signal VDS is larger than a predetermined value, the method advances to step S415, but if the voltage difference signal VDS is not larger than a predetermined value, the method advances to step S410. In step S410, the adaptive controller 250 does not generate a PWM signal, but in step S415, the adaptive controller 250 does generate a PWM signal PS. In step S420, the PWM controller 260 receives a control signal PCS from the adaptive controller 250. In step S425, the PWM controller 260 transmits the PWM signal PS to the control end of the transistor 230. It is worth mentioning that, a product obtained by multiplying the current flowing through the light string 220 and the PWM signal PS is constant.

Figure 5:
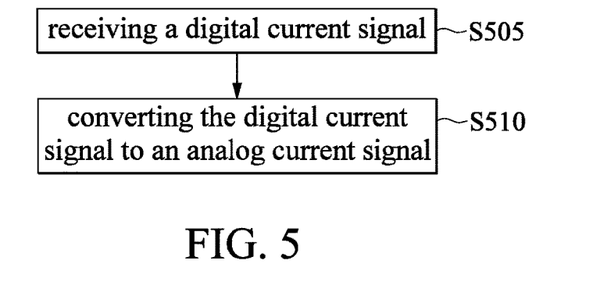
FIG. 5 shows a flow chart of a control method of an adaptive backlight device according to still another embodiment of the present disclosure.

Reference is made to FIG. 2 and FIG. 5. FIG. 5 shows a flow chart of a control method of an adaptive backlight device according to still another embodiment of the present disclosure. In step S505, the digital-to-analog converter 270 receives a digital current signal DS from the adaptive controller 250. In step S510, the digital-to-analog converter 270 converts the digital current signal DS to an analog current signal AS.

Figure 6:
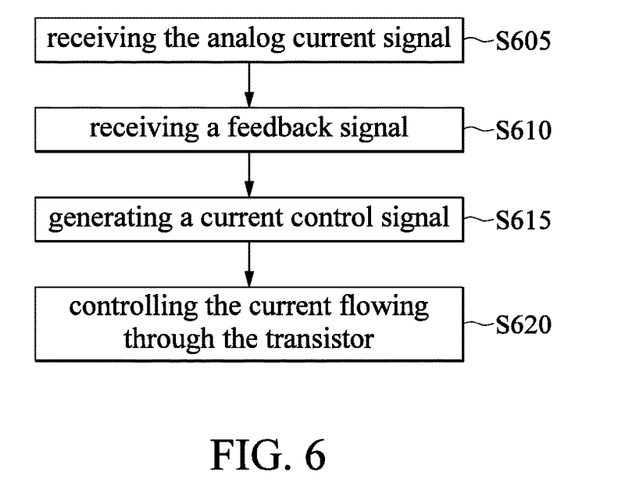
FIG. 6 shows a flow chart of a control method of an adaptive backlight device according to still another embodiment of the present disclosure.

Reference is made to FIG. 2 and FIG. 6. FIG. 6 shows a flow chart of a control method of an adaptive backlight device according to still another embodiment of the present disclosure. In step S605, the analog current signal AS is received by the non-inverting input end of the operational amplifier 280. In step S610, a feedback signal FS from the transistor 230 is received by the inverting input end of the operational amplifier 280. In step S615, the operational amplifier 280 generates a current control signal ICS according to the analog current signal AS and the feedback signal FS. In step S620, the current flowing through the transistor 230 is controlled by the current control signal ICS.

To sum up, in the adaptive backlight device provided by the present invention, the voltage detector detects the cross voltage of the transistor, and then the adaptive controller determines whether the cross voltage of the transistor is larger than or equal to a predetermined value. When the cross voltage of the transistor is smaller than the predetermined value, the adaptive controller maintains the current flowing through the light string. When the cross voltage of the transistor is larger than or equal to the predetermined value, the adaptive controller increases the current flowing through the light string t to increase the cross voltage of the light string and decrease the cross voltage of the transistor, which prevents the temperature of the transistor from increasing too much. Moreover, if the current flowing through the light string is increased, the PWM signal will be smaller such that the brightness of the light strings are able to match with each other.

The descriptions illustrated supra set forth simply the preferred embodiments of the present disclosure; however, the characteristics of the present disclosure are by no means restricted thereto. All changes, alterations, or modifications conveniently considered by those skilled in the art are deemed to be encompassed within the scope of the present disclosure delineated by the following claims.

What is claimed is:

1. An adaptive backlight device, used for controlling at least one light string, wherein a power supply is connected to one end of the light string, a voltage from the power supply is provided to the light string, the light string has a plurality of LEDs, and the light string has a cross voltage, comprising:
    a transistor having a first end, a second and a control end, wherein the first end of the transistor is connected to the other end of the light string, the transistor controls a current flowing through the light string, and a cross voltage of the transistor is obtained according to a voltage difference between a voltage at the first end of the transistor and a voltage at the second end of the transistor;
    a voltage detector having a first input end and a second input end, wherein the first input end of the voltage detector is coupled to the first end of the transistor and receives a first voltage signal, the second input end of the voltage detector is coupled to the second end of the transistor and receives a second voltage signal, the voltage detector generates a voltage difference signal according to the first voltage signal and the second voltage signal; and
    an adaptive controller connected to the voltage detector and the control end of the transistor and including a counter, wherein the adaptive controller receives the voltage difference signal from the voltage detector;
    wherein when the adaptive controller determines that the voltage difference signal is larger than or equal to a predetermined value, the adaptive controller increases the current flowing through the light string at least once;
    wherein when the voltage difference signal has been larger than or equal to the predetermined value over a predetermined time duration, the counter adds 1 to its count value, and the adaptive controller increases the current flowing through the light string step by step, and when the adaptive controller determines that the voltage difference signal is smaller than the predetermined value and/or that the voltage difference signal exceeds the predetermined time duration, the counter sets its count value to zero.

2. The adaptive backlight device according to claim 1, wherein when the adaptive controller determines that the voltage difference signal is smaller than the predetermined value, the adaptive controller maintains the current flowing through the light string.

3. The adaptive backlight device according to claim 1, wherein the adaptive controller further includes:
    a voltage determination circuit connected to the voltage detector and the counter, receiving the voltage difference signal, and calculating the cross voltage of the transistor according to the voltage difference signal.

4. The adaptive backlight device according to claim 1, further comprising:
    a PWM controller connected to the adaptive controller and the control end of the transistor, wherein when the voltage difference signal is larger than the predetermined value, the adaptive controller generates and transmits a control signal to the PWM controller, the PWM controller transmits a PWM signal to the control end of the transistor according to the control signal, wherein a product obtained by multiplying the current flowing through the light string and the PWM signal is constant.

5. The adaptive backlight device according to claim 1, further comprising:
    a digital-to-analog converter, connected to the adaptive controller, the digital-to-analog converter receives a digital current signal from the adaptive controller, and converts the digital current signal to an analog current signal.

6. The adaptive backlight device according to claim 1, further comprising:
    an operational amplifier having an inverting input end, non-inverting input end and an output end, the non-inverting input end of the operational amplifier being connected to the digital-to-analog converter to receive the analog current signal, the inverting input end of the operational amplifier being connected to the second end of the transistor to receive a feedback signal, the output end of the operational amplifier being connected to the control end of the transistor, and the operational amplifier generating and transmitting a current control signal to the control end of the transistor according to the analog current signal and the feedback signal to control the current flowing through the transistor.

7. The adaptive backlight device according to claim 6, further comprising:
    a resistor, wherein one end of the resistor is connected to the second end of the transistor and the inverting input end of the operational amplifier, and the other end of the resistor is grounded.

8. The adaptive backlight device according to claim 4, wherein the transistor, the voltage detector, the adaptive controller, the PWM controller, the digital-to-analog converter, the operational amplifier and the resistor are configured on a chip.

9. The adaptive backlight device according to claim 7, wherein the transistor, the voltage detector, the adaptive controller, the PWM controller, the digital-to-analog converter, the operational amplifier and the resistor are configured on a chip.

10. A control method of a backlight device, adapted to an adaptive backlight system, wherein the adaptive backlight system includes a power supply, at least one light string, a transistor, a voltage detector and an adaptive controller, the transistor has a first end, a second end and a control end, the voltage detector has a first input end and a second input end, and the adaptive controller has a counter, comprising:
  controlling the current flowing through the light string via the transistor;
  obtaining a cross voltage of the transistor according to a voltage difference between a voltage at the first end of the transistor and a voltage at the second end of the transistor;
  receiving a first voltage signal from the first input end of the voltage detector and receiving a second voltage signal from the second input end of the voltage detector;
  generating a voltage difference signal by the voltage detector according to the first voltage signal and the second voltage signal; and
  receiving the voltage difference signal by the adaptive controller from the voltage detector;
  wherein when the adaptive controller determines that the voltage difference signal is larger than or equal to a predetermined value, the adaptive controller increases the current flowing through the light string at least once to increase a cross voltage of the light string and decrease the cross voltage of the transistor;
  wherein when the voltage difference signal has been larger than or equal to the predetermined value over a predetermined time duration, the counter adds 1 to its count value, and the adaptive controller increases the current flowing through the light string step by step, and when the adaptive controller determines that the voltage difference signal is smaller than the predetermined value and/or that the voltage difference signal exceeds the predetermined time duration, the counter sets its count value to zero.

11. The control method according to claim 10, wherein when the adaptive controller determines that the voltage difference signal is smaller than the predetermined value and/or that the voltage difference signal exceeds the predetermined time duration, the adaptive controller maintains the current flowing through the light string.

12. The control method according to claim 10, wherein the adaptive controller further includes a voltage determination circuit connected to the voltage detector and the counter, further comprising:
  receiving the voltage difference signal and calculating the cross voltage of the transistor by the voltage determination according to the voltage difference signal.

13. The control method according to claim 10, wherein the adaptive backlight system further includes a PWM controller connected to the adaptive controller, further comprising:
  generating a control signal by the adaptive controller when the voltage difference signal is larger than the predetermined value;
  receiving the control signal by the PWM controller from the adaptive controller;
  transmitting a PWM signal to the control end of the transistor by the PWM controller;
  wherein a product obtained by multiplying the current flowing through the light string and the PWM signal is constant.

14. The control method according to claim 10, wherein the adaptive backlight system further includes a digital-to-analog converter, further comprising:
  receiving a digital current signal by the digital-to-analog converter from the adaptive controller; and
  converting the digital current signal to an analog current signal by the digital-to-analog converter.

15. The control method according to claim 10, wherein the adaptive backlight system further includes an operational amplifier having an inverting input end, a non-inverting input end and an output end, the control method further comprising:
  receiving the analog current signal by the non-inverting input end of the operational amplifier;
  receiving a feedback signal by the inverting input end of the operational amplifier;
  generating a current control signal by the operational amplifier according to the analog current signal and the feedback signal; and
  controlling the current flowing through the transistor according the current control signal.

16. An adaptive backlight system, comprising:
  a power supply;
  at least one light string, wherein the power supply is connected to one end of the light string, a voltage from the power supply is provided to the light string, the light string has a plurality of LEDs, and the light string has a cross voltage; and
  an adaptive backlight device, including:
    a transistor having a first end, a second and a control end, wherein the first end of the transistor is connected to the other end of the light string, the transistor controls a current flowing through the light string, and a cross voltage of the transistor is obtained according to a voltage difference between a voltage at the first end of the transistor and a voltage at the second end of the transistor;
    a voltage detector having a first input end and a second input end, wherein the first input end of the voltage detector is coupled to the first end of the transistor and receives a first voltage signal, the second input end of the voltage detector is coupled to the second end of the transistor and receives a second voltage signal, and the voltage detector generates a voltage difference signal according to the first voltage signal and the second voltage signal; and
    an adaptive controller connected to the voltage detector and the control end of the transistor and including a counter, wherein the adaptive controller receives the voltage difference signal from the voltage detector;
  wherein when the adaptive controller determines that the voltage difference signal is larger than or equal to a predetermined value, the adaptive controller increases the current flowing through the light string at least once;
  wherein when the voltage difference signal has been larger than or equal to the predetermined value over a predetermined time duration, the counter adds 1 to its count value, and the adaptive controller increases the current flowing through the light string step by step, and when the adaptive controller determines that the voltage difference signal is smaller than the predetermined value and/or that the voltage difference signal exceeds the predetermined time duration, the counter sets its count value to zero.

* * * * *